United States Patent [19]
Cameron

[11] Patent Number: 5,050,466
[45] Date of Patent: Sep. 24, 1991

[54] CLAMPING TOOLS FOR AIR BRAKES

[76] Inventor: Charles M. Cameron, 904 Briar Ct., Cheyenne, Wyo. 82007

[21] Appl. No.: 214,546

[22] Filed: Jul. 1, 1988

Related U.S. Application Data

[62] Division of Ser. No. 65,284, Jun. 22, 1987, Pat. No. 4,776,079.

[51] Int. Cl.$^5$ ............................................... B25B 7/02
[52] U.S. Cl. ........................................ 81/419; 81/421; 81/426.5; 81/487
[58] Field of Search ................. 81/418, 419, 421, 424, 81/426.5, 487, 420, 13, 9.3

[56] References Cited

U.S. PATENT DOCUMENTS

| | | | |
|---|---|---|---|
| 64,904 | 5/1967 | Perry et al. | 81/13 |
| 166,141 | 7/1975 | Prindle | 81/13 X |
| 686,236 | 11/1901 | McKim | 81/13 |
| 1,007,824 | 11/1911 | Trosper | 81/424 X |
| 1,334,965 | 3/1920 | Ridings | 81/424 X |
| 1,445,908 | 2/1923 | Perkins | 81/421 X |
| 3,098,541 | 7/1963 | Kadas | 81/419 X |
| 3,882,586 | 5/1975 | Schmidt | 81/426.5 X |
| 4,169,395 | 10/1979 | Hoskinson | 81/421 X |
| 4,617,710 | 10/1986 | Kotnik | 81/419 X |

Primary Examiner—James G. Smith
Attorney, Agent, or Firm—Dean P. Edmundson

[57] ABSTRACT

There are two embodiments of clamping tools described which are useful in removal and installation of air brake assemblies of the type including a brake can and a brake can tube held together by means of a retention ring. One clamping tool is adapted to support the brake can and brake can tube and slowly release them against the action of a compressed wedge spring. The other clamping tool is adapted to secure and controllably release a retention ring of the type having two ends fastened together by means of a bolt and nut.

2 Claims, 6 Drawing Sheets

CLAMPING TOOLS FOR AIR BRAKES

CROSS-REFERENCE TO RELATED APPLICATION

This application is a division of my co-pending application Ser. No. 065,284, filed June 22, 1987 now U.S. Pat. No. 4,776,079.

FIELD OF THE INVENTION

This invention relates to clamping tools. More particularly, this invention relates to clamping tools for supporting air brake chambers used in air brake systems in trucks or the like.

BACKGROUND OF THE INVENTION

Air brake systems such as are used on large trucks and trailers, for example, include one or more air brake chambers. Each air brake chamber may be generally referred to as a brake can which is fastened at its open end to a brake can tube on the vehicle. A strong wedge spring is compressed within the brake can when the brake can and brake can tube are fastened together.

When service or repair work is performed on the air brake system it is necessary to remove the brake can from the brake can tube. Because the compressed wedge spring can exert tremendous outward force, it is necessary to exercise extreme caution when loosening and removing the brake can; otherwise the brake can may be forced away from the brake can tube with such great energy that a workman may become injured if struck by a flying brake can. Also, if there is air pressure in the air line when loosening the brake can, the workman could become injured because the, air pressure could force a violent separation of the brake can from the brake can tube.

Problems of a similar nature are encountered after repairs have been made and it is necessary to install the brake can onto the brake can tube again. Typically the brake can and brake can tube each include a flange around the periphery of their open end, and these flanges are forced together and then captured in a retention ring. The retention ring has two ends which are secured together by means of a bolt and nut after the retention ring is placed around the abutting flanges of the brake can and brake can tube. If the retention ring is not properly in place, or is not properly tightened, the compressed wedge spring may force the brake can and brake can tube apart with great force, in the manner explained above.

Various types of clamping tools have been previously described. See, for example, U.S. Pat. Nos. 1,953,926; 2,899,995; 3,144,793; 3,314,319; 3,395,724; 3,498,157;, 3,585,704; 4,235,073; 4,344,215; 4,542,583; and 4,601,221. See also French Patent No. 1,297,140. None of such prior tools, however, are suitable for use in accordance with the requirements of this invention.

SUMMARY OF THE PRESENT INVENTION

In accordance with the present invention there is provided, in one embodiment, a clamping tool which is especially useful for securely holding together the brake can and brake can tube in an air brake system during repair procedures to prevent the brake can from flying off and injuring a workman or bystander. The clamp can be released slowly so that the brake can and brake can tube are eased apart and the compression force on the wedge spring is slowly released. In this manner the brake can may be safely removed or installed without danger of injury to anyone during repair operations.

The clamping tool of this embodiment includes (a) a pair of handle members which are adapted to pivot with respect to each other, and (b) a pair of clamping arms carried by the handle members. One clamping arm includes a jaw member (preferably comprising a hook) which is adapted to engage the rear face of the brake can tube. The other clamping arm includes a jaw member which is attached to an elongated support leg and which is adapted to engage the rear face of the brake can. The support leg is adjustably mounted on the clamping arm so that the jaw member can be moved inwardly or outwardly relative to the jaw member on the other clamping arm so that the clamping tool can accommodate different sizes of brake cans.

The handle members are movable between open and closed positions to correspondingly move the jaw members to an open or closed position, as required. Preferably the handle members can be locked in closed position so that the clamp remains securely closed to hold the brake can and brake can tube together when necessary.

In another embodiment the present invention provides another clamping tool which is useful for securing and controllably releasing the retention ring of the type having two ends which are fastened together with a bolt and nut. This is the type of retention ring used to secure together the brake can and brake can tube of an air brake system, for example.

This embodiment of clamp includes (a) a pair of handle members which are adapted to pivot with respect to each other, and (b) a pair of clamping arms carried by the handle members. One of the jaws of the clamping arms includes a socket member, and the other jaw includes a fork member. The socket is adapted to engage the head of the bolt of the retention ring, and the fork member is adapted to engage the retention ring adjacent to the nut on the bolt.

In this manner the clamp securely holds the ends of the retention ring together while allowing the nut to be loosened and removed. Then the clamp can be slowly released to control the retention ring and prevent it from releasing too quickly or in an unsafe manner. This clamp is also very useful in installing a retention ring because it is capable of safely holding the retention ring in proper position while the nut is threaded onto the bolt to secure the retention ring. This saves considerable time and is very safe and effective Thus, by employing both types of clamps in the removal or installation of brake cans in air brake systems, the task is completed much more quickly than previously possible. Also, the risk of injury is significantly reduced because the components of the air brake system are controlled by the clamps to prevent them from flying apart.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
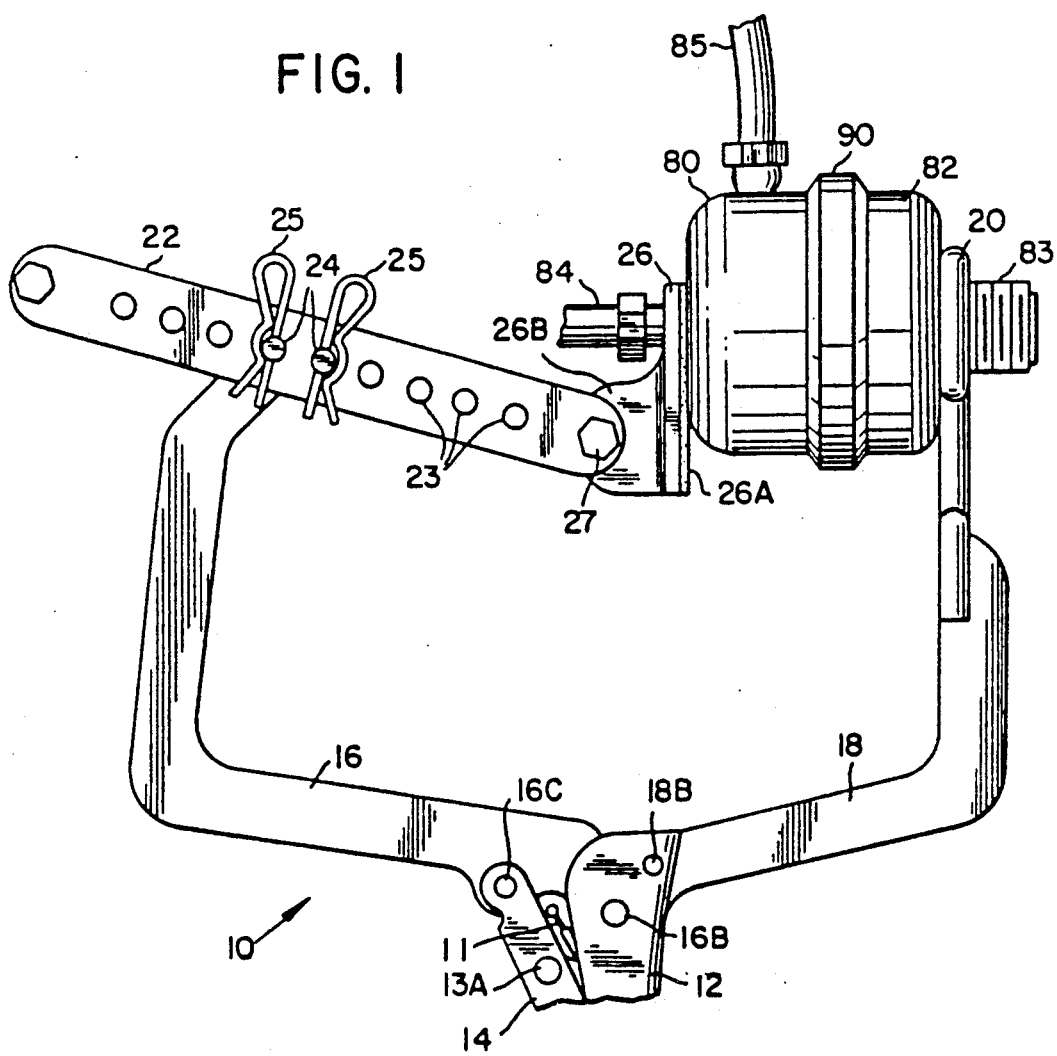
FIG. 1 is a side elevational view illustrating the use of one embodiment of clamping tool of the invention in securely holding and supporting the brake can and brake can tube of an air brake system.
Figure 2:
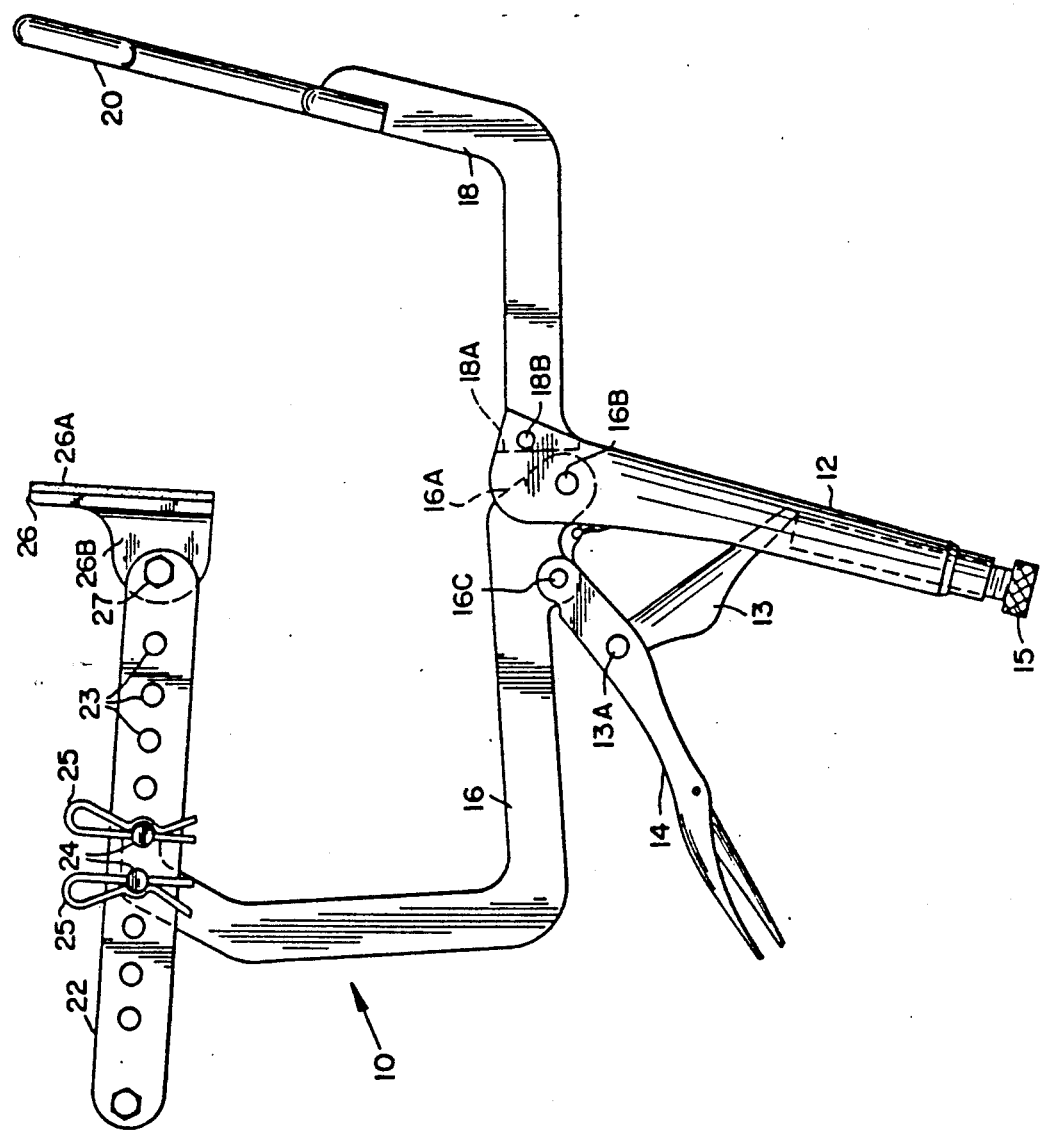
FIG. 2 is a side view of the clamping tool shown in FIG. 1 with the clamping arms in their open position.
Figures 3, 6:
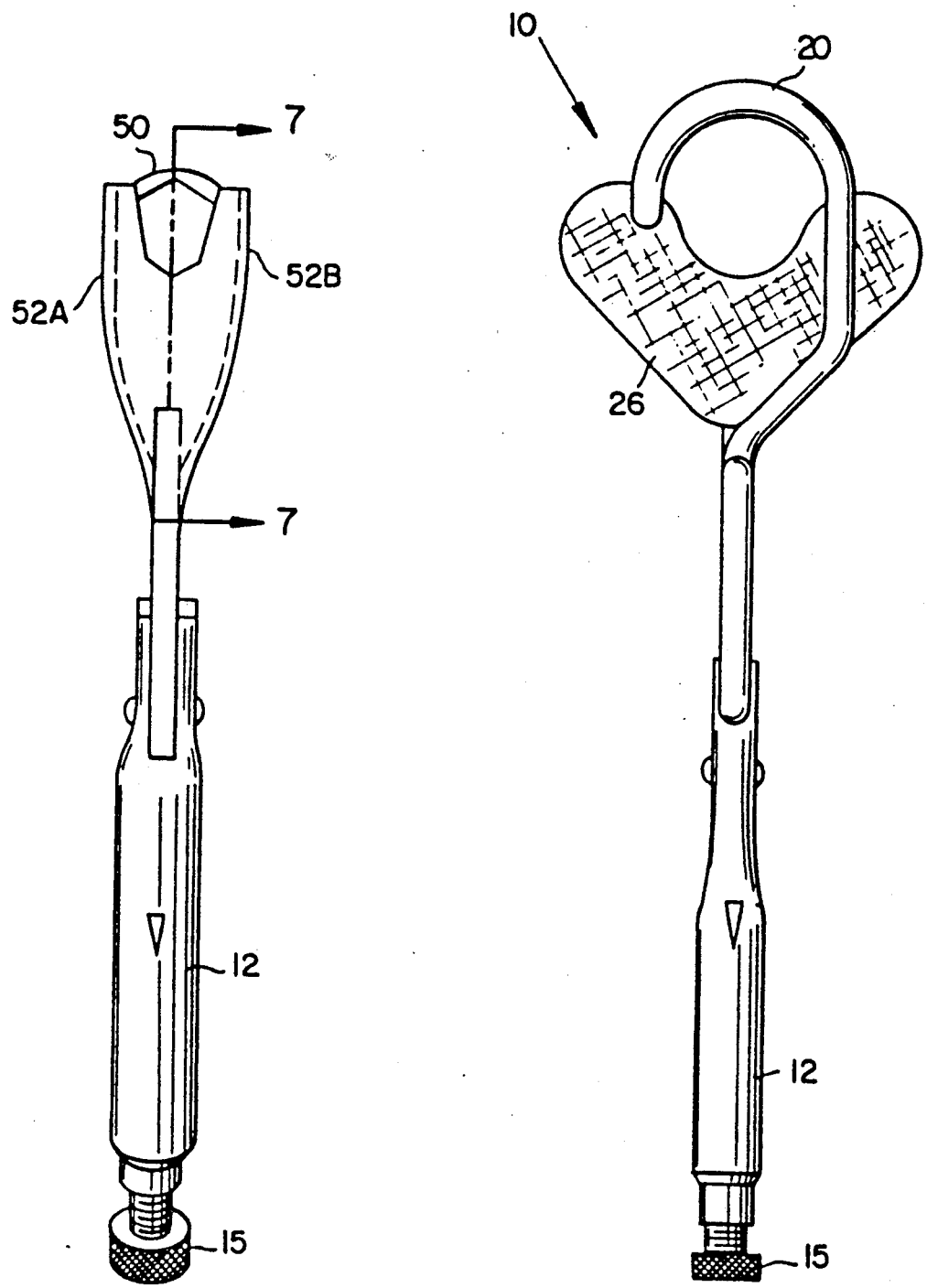
FIG. 3 is an edge view of the clamping tool shown in FIGS. 1 and 2.
FIG. 6 is an edge view of the clamping tool shown in FIG. 5.

Thus, in FIGS. 1, 2, and 3 there is illustrated a clamping tool 10 of the invention which is useful for securing and supporting brake can 80 and brake can tube portion 82 of a conventional air brake system for removal and also for installation procedures. In the air brake system shown in FIG. 1, air lines 84 and 85 are connected to the brake can 80.

The clamping tool 10 includes a pair of handle members 12 and 14, and a pair of clamping arms 16 and 18. In the embodiment shown, one end 16A of arm 16 and one end 18A of arm 18 are each connected to the upper end of handle member 12. Pin 18B secures arm 18 to handle 12, and pin 16B pivotally connects arm 16 to handle 12. Arm 16 also is pivotally connected by means of pin 16C to the upper end of handle 14. In this manner it may be said that handle members 12 and 14 are pivotally connected to each other.

Strut member 13 is pivotally connected by means of pin 13A at one end to handle 14. The opposite end of strut 13 is received within the open side of handle 12 and rests on top of screw 15 which is threadably received within handle 12. When handle 14 is moved towards handle 12, strut 13 causes the upper end of handle 14 to move upwardly and outwardly, thereby causing clamping arm 16 to pivot about pin 16B and move toward clamping arm 18. By rotating screw 15 in a clockwise direction the portion of the screw within handle 12 is lengthened, the effect of which is to cause the clamping arm 16 to be located closer to arm 18 when the handles are in their closed position. Rotating screw 15 in the opposite direction has the opposite effect. The handles preferably are adapted to lock in their closed position when the centerline of handle 14 passes over the centerline of strut 13. This type of handle operation is well known in locking pliers. Spring member 11 is connected between arm 16 and handle 12 to bias arm 16 to a normally outward position.

Clamping arm 18 preferably includes a hook member 20 which can extend past mounting tube 83 on the rear face of brake can tube portion 82. The hook member is forced against the rear face of brake can tube portion 82, as shown. Preferably the tip of the hook member extends downwardly to a point below the mounting tube 83. This provides additional control and helps to hold the clamping tool in proper position at all times. Instead of a hook member it is possible to use a Y-shaped member or forked member, if desired, but the hook member seems to be easier to use.

Clamping arm 16 has an elongated support leg 22 adjustably mounted thereon. The support leg includes a plurality of longitudinally spaced openings 23 therealong, as illustrated. The support leg can be mounted to the outer end of clamping arm 16 by means of pins 24 which extend through the desired openings 23 and registering apertures 17 in the end of arm 16. Clips 25 may be used to secure the pins 24 in place.

Thus, pins 24 may be removed in order to permit support leg 22 to be moved either closer to arm 18 or further away from it and then re-mounted on the end of clamping arm 16. This type of adjustment enables the clamping tool to be used on various types of brake cans having different sizes, etc. For example, the clamping tool may be used on so-called maxi-cans as well as on other sizes of brake cans.

At the inner end of support leg 22 a jaw member 26 is pivotally attached by means of bolt 27 and nut 27A. Jaw member 26 preferably is fork shaped, as illustrated, and includes a flat face 26A. The flat face is adapted to bear against the rear face of brake can 80. The forked shape enables the jaw member to be positioned on the rear face of brake can 80 with one arm of the fork on each side of air line 84, as shown.

Figure 4:
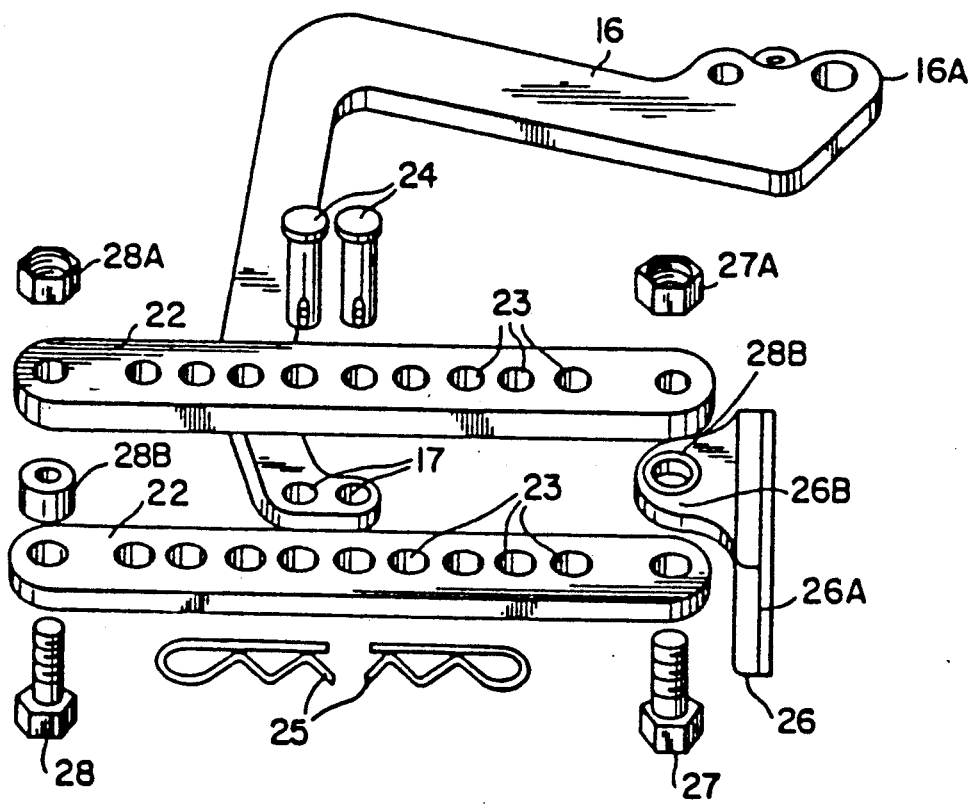
FIG. 4 illustrates one manner in which a jaw member is adjustably carried by one clamping arm of the clamping tool shown in FIGS. 1-3.
Figure 5:
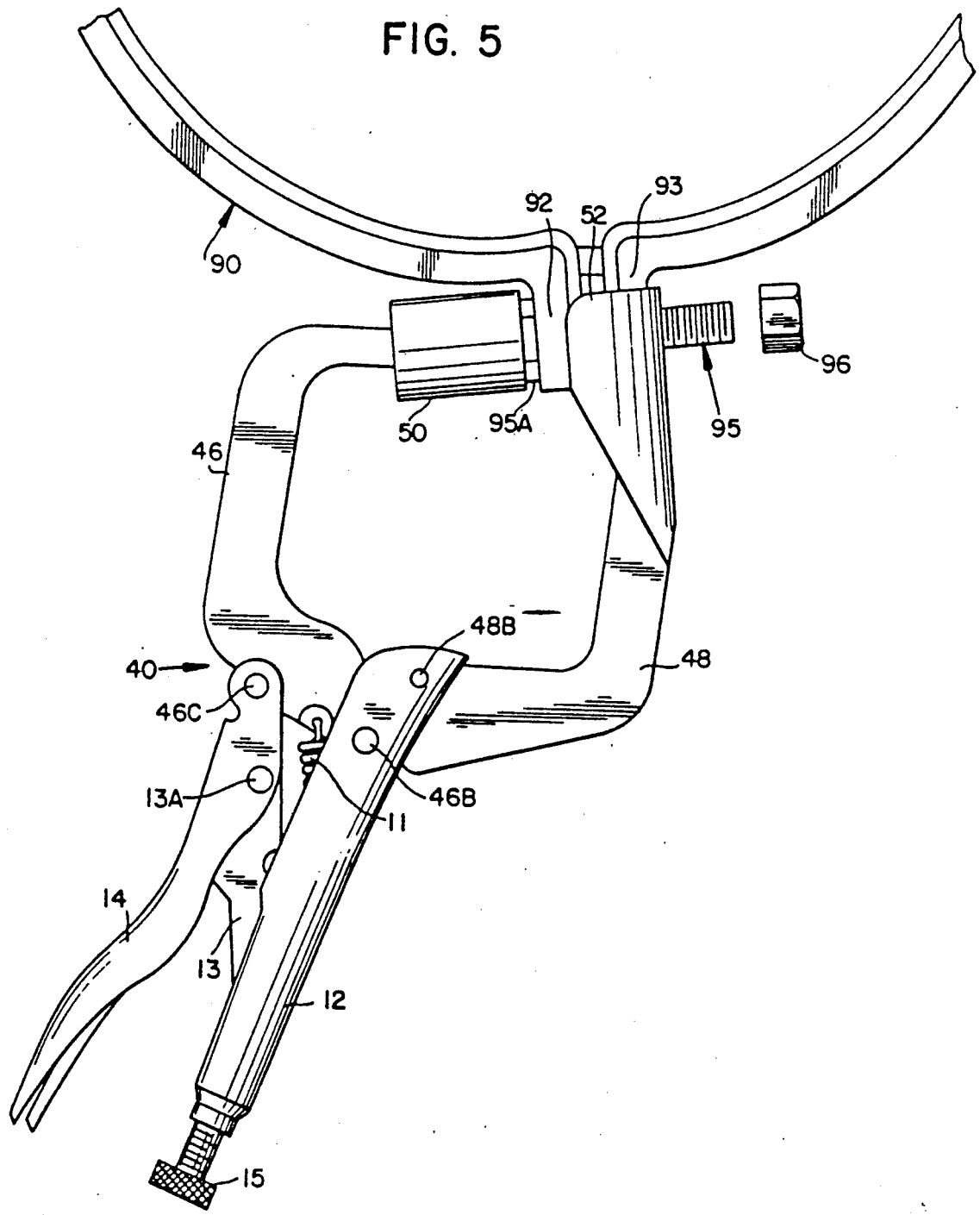
FIG. 5 is an elevational view illustrating the use of another embodiment of clamping tool of the invention in securing and controlling a retention ring.

As illustrated in FIG. 4, the support leg may include two identical bars 22, each of which includes a plurality of longitudinally spaced openings 23. Clamp arm 16 is then secured between the bars 22 by means of pins 24 which extend through registering openings 23 and apertures 17, as illustrated. Bolt 28, spacer 28B, and nut 28A are present on the outer end of bars 22 to secure the bars together in a spaced arrangement. Mounting ear 26B of jaw member 26 is positioned between the two bars 22 prior to securement with bolt 27 and nut 27A.

The lengths of the clamping arms 16 and 18 may vary, as desired. The length of the support leg may also vary. Typically support leg 22 is about eight inches long.

With the provision of spaced mounting openings 23 in leg 22, there is a great deal of adjustment possible in the positioning of the jaw member 26 relative to hook member 20. Minor adjustment can also be made by means of screw 15 in handle 12.

Thus, the clamping tool 10 illustrated in FIGS. 1-4 is especially useful in holding the brake can 80 and brake can tube 82 together during removal or installation procedures. Retention ring 90 encircles the abutting flanges or edges of the brake can and brake can tube and normally secures the two items together when the air brake system is fully assembled. After clamping tool 10 is applied and closed tight (as shown in FIG. 1) the retention ring 90 may be safely loosened and removed. Then clamping tool 10 may be slowly released so that items 80 and 82 are controlled, and still secured by clamping tool 10, until the compression wedge spring tension is relieved. If air pressure is still present in the brake can the clamping tool secures the brake can in place and prevents it from flying off and injuring someone. After the air pressure is reliefed or shut off, then the brake can may be safely removed.

For assembly of the system again, the opened clamp is applied to the brake can and brake can tube which are then urged together as the clamp is closed. Then the retention ring 90 may be applied and tightened to permanently secure the brake can and brake can tube together.

In FIGS. 5-8 there is illustrated another useful clamping tool 40 of the invention which is especially useful for securing and holding a retention ring 90 of the type including two ends 92 and 93 which are fastened together by means of bolt 95 and nut 96. Typically, each end of the ring is angled outwardly from the ring at a 90° angle and includes an opening therethrough. The bolt 95 extends through both such openings, and nut 96 may be threaded onto bolt 95 and tightened to secure the retention ring.

Clamping tool 40 includes a pair of handle members 12 and 14 which are analogous to the handle members of clamping tool 10 in design and operation. Clamping tool 40 also includes clamping arms 46 and 48. The lower end of arm 46 is pivotally attached to the upper end of handle 12 by means of pin 46B. The upper end of handle 14 is also pivotally attached to arm 46 by means of pin 46C. Spring member 11 is attached between arm 46 and handle 12 to bias arm 46 to a normally outward position.

To the upper end of clamping arm 46 there is pivotally attached a socket member 50. The open end of the socket faces generally toward the facing jaw member 52 on the upper end of clamping arm 48. The socket 50 is adapted to slidably engage the head 95A of bolt 95. Socket member 50 may be secured against rotation so that when nut 96 is rotated the bolt 95 cannot rotate. However, preferably the socket may be tilted upwardly, downwardly or to either side.

Jaw member 52 preferably is forked so that the sides 52A and 52B of the fork can engage the end of the retention ring on both sides of the nut 96. In this manner the clamping tool 40 can hold the retention ring in a closed position while the nut 96 on bolt 95 is loosened and removed.

Figure 7:
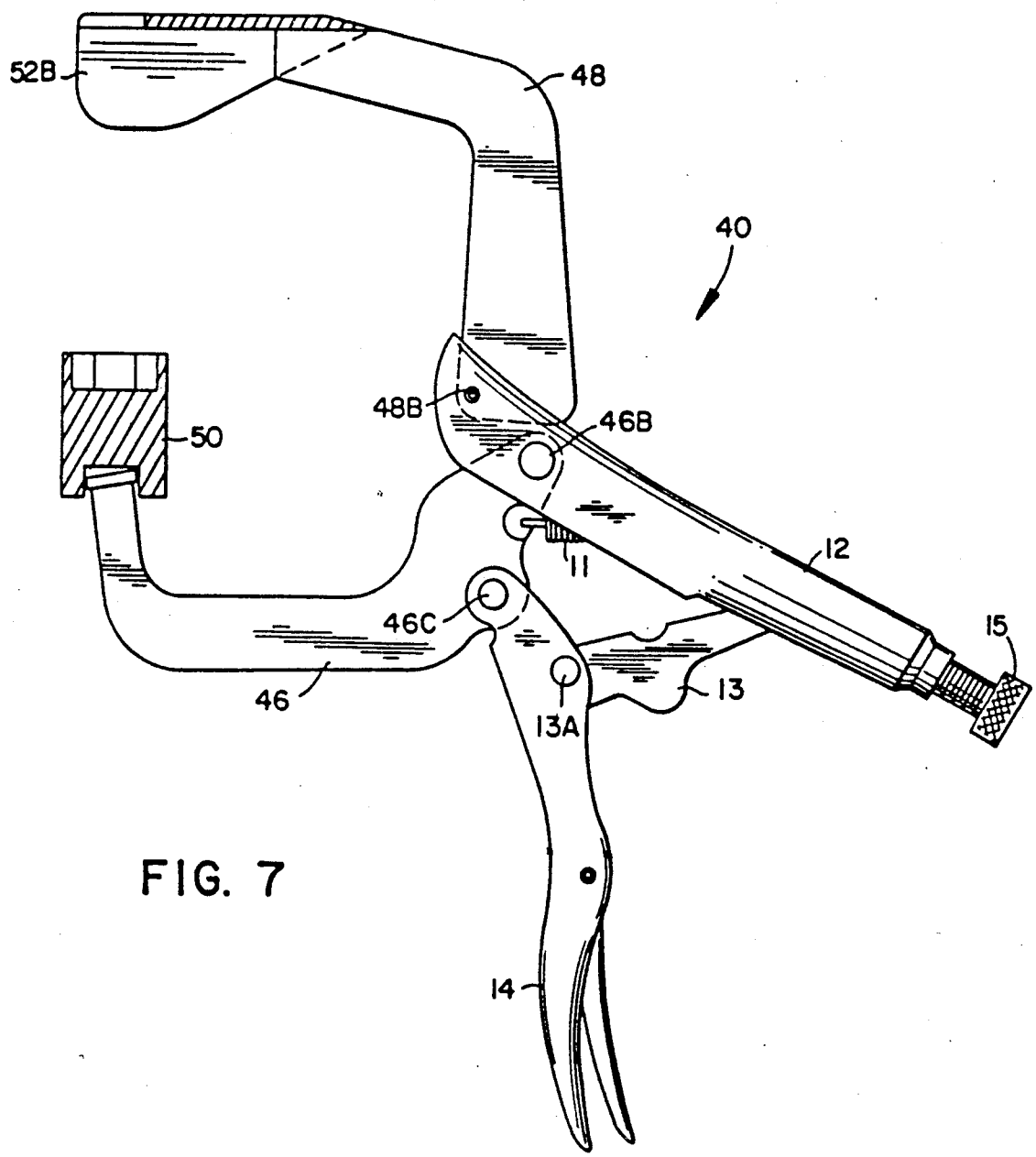
FIG. 7 is a side view, partially in section, of the clamping tool of FIG. 6.
Figure 8:
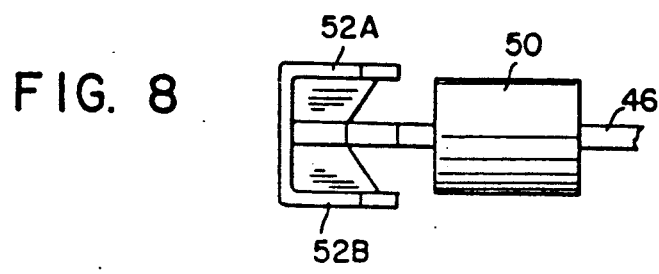
FIG. 8 is a top view of the clamping tool shown in FIG. 6.

As illustrated in FIG. 7, preferably each side of the forked jaw member includes an elongated wall section. The wall sections are parallel to each other to define a channel therebetween.

Other variants are possible without departing from the scope of the present invention.

What is claimed is:

1. A clamping tool for securing and controllably releasing a retention ring of the type having two ends fastened together by means of a bolt and nut, said clamping tool comprising:
   (a) a pair of handle members pivotally connected to each other;
   (b) a pair of clamping arms carried by said handle members; wherein a first said clamping arm includes a first jaw member comprising a socket member; wherein said socket member is pivotally attached to said first clamping arm; wherein a second said clamping arm includes a second jaw member comprising an upstanding back wall and spaced-apart parallel side walls extending from said back wall toward said first jaw member; wherein said back wall defines a fork having first and second spaced-apart fingers; wherein said fingers are adapted to engage said retention ring on opposite sides of said nut in a manner such that said nut is accessible to be loosened or tightened on said bolts; wherein said handle members are movable between first and second positions in a manner such that said jaw members on said clamping arms are moved towards each other when said handle members are in said first position and said jaw members are moved away from each other when said handle members are in said second position; wherein said socket member is adapted to slidably engage said bolt and said fingers are adapted to engage said retention ring adjacent said nut when said handle members are in said first position and said retention ring is disposed between said side walls.

2. A clamping tool in accordance with claim 1, wherein said handle members are adapted to be locked in said first position.

* * * * *